United States Patent
Thomasson

(10) Patent No.: US 11,592,066 B2
(45) Date of Patent: Feb. 28, 2023

(54) CLUTCH ENGAGEMENT BOOSTER SYSTEM

(71) Applicant: John Philip Thomasson, Apache Junction, AZ (US)

(72) Inventor: John Philip Thomasson, Apache Junction, AZ (US)

( * ) Notice: Subject to any disclaimer, the term of this patent is extended or adjusted under 35 U.S.C. 154(b) by 165 days.

(21) Appl. No.: 17/317,840

(22) Filed: May 11, 2021

(65) Prior Publication Data

US 2021/0348657 A1    Nov. 11, 2021

Related U.S. Application Data

(60) Provisional application No. 63/023,141, filed on May 11, 2020.

(51) Int. Cl.
*F16D 48/04* (2006.01)
*F16D 48/02* (2006.01)

(52) U.S. Cl.
CPC ............. *F16D 25/14* (2013.01); *F16D 48/04* (2013.01); *F16D 2048/0203* (2013.01); *F16D 2048/0215* (2013.01); *F16D 2048/0269* (2013.01)

(58) Field of Classification Search
CPC .......... F16D 25/04; F16D 25/18; F16D 48/04; F16D 2048/0203; F16D 2048/0215; F16D 2048/0269; F16D 13/54
See application file for complete search history.

(56) References Cited

U.S. PATENT DOCUMENTS

| | | | |
|---|---|---|---|
| 1,039,537 A | 9/1912 | Hofmann | |
| 2,095,779 A * | 10/1937 | Whittington | B60W 10/02 192/85.15 |
| 2,633,035 A * | 3/1953 | Livermore | F16H 61/0269 74/330 |
| 8,002,100 B2 | 8/2011 | Herter et al. | |
| 2008/0196989 A1* | 8/2008 | Petzold | F16D 48/04 701/67 |
| 2012/0186934 A1* | 7/2012 | Ota | F16D 48/02 192/85.63 |
| 2018/0162381 A1 | 6/2018 | Colavincenzo et al. | |

FOREIGN PATENT DOCUMENTS

| | | |
|---|---|---|
| CN | 2811659 Y | 8/2006 |
| CN | 102518502 B | 6/2012 |

* cited by examiner

*Primary Examiner* — Huan Le

(57) ABSTRACT

A clutch engagement booster system is an apparatus used to support and improve clutch engagement on motor vehicles, both as a modification to existing clutch assemblies or as a standalone installation in various embodiments. The clutch engagement booster system utilizes a casing and pressure housing supporting a diaphragm, an expansion chamber, an engagement member, and at least one clutch element. The expansion chamber is formed between the diaphragm and the pressure housing in fluid communication with at least one pressure source through the at least one regulator device. The at least one clutch element is positioned within the casing, opposite the diaphragm across the engagement member. As the expansion chamber is pressurized the diaphragm deforms towards the engagement member, thereby forcing the at least one clutch element into engagement to transfer power through a host transmission.

18 Claims, 6 Drawing Sheets

CLUTCH ENGAGEMENT BOOSTER SYSTEM

The current application claims a priority to the U.S. Provisional Patent application Ser. No. 63/023,141 filed on May 11, 2020.

FIELD OF THE INVENTION

The present invention generally relates to a clutch control mechanism. More specifically, the present invention relates to a clutch booster intended to be utilized in conjunction with any conventional clutch mechanism.

BACKGROUND OF THE INVENTION

Clutches are used in automobile or engine transmissions to synchronize two rotating shafts that are spinning at different speeds, generally acting as a selective engagement between an output shaft of an engine and a variable gearbox. A clutch can connect two such shafts so that they spin simultaneously, transferring power from the engine to another part of the machine, or decouple them so that they spin at different speeds, preventing transfer of power within the machine without also stopping the engine.

Automobiles are commonly provided with a clutch actuator connected to a clutch assembly that is configured to selectively separate frictionally coupled elements and to transfer energy from a power source. A clutch incorporates a set of components used to make the engine move, allowing the driver to control the car. When the clutch is engaging and disengaging, the clutch generates heat and wear because of the friction created between the clutch disc, pressure plate, and flywheel. The hotter the clutch disc gets, the more rapidly it wears. If some components (e.g., clutch disc) overheat, the springs in the clutch system can become weak, compromising the clamping force, so that the clutch slips.

Clutches can include a mechanical actuation system, but such a system offers limited clamping force and torque. Smaller vehicles can use mechanical clutches, but pneumatic clutches, which employ tightly compressed air to transfer energy from one moving part of a machine to another, offer advantages for operation of many machines in a variety of situations.

Accordingly, various companies have developed pneumatic clutches that offer a number of advantages, including not only greater clamping force but also superior thermal capacity—for they do not generate heat during extended periods of engagement.

In addition, pneumatic clutches can be designed to direct air across the clutch plates for cooling. Accordingly, there is a need to develop a pneumatic device that can provide existing clutch systems with additional clamping force.

The present invention is intended to address problems associated with and/or otherwise improve on conventional devices through an innovative pneumatic device that is designed to provide additional clutch clamping force in an existing engine while incorporating other problem-solving features.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
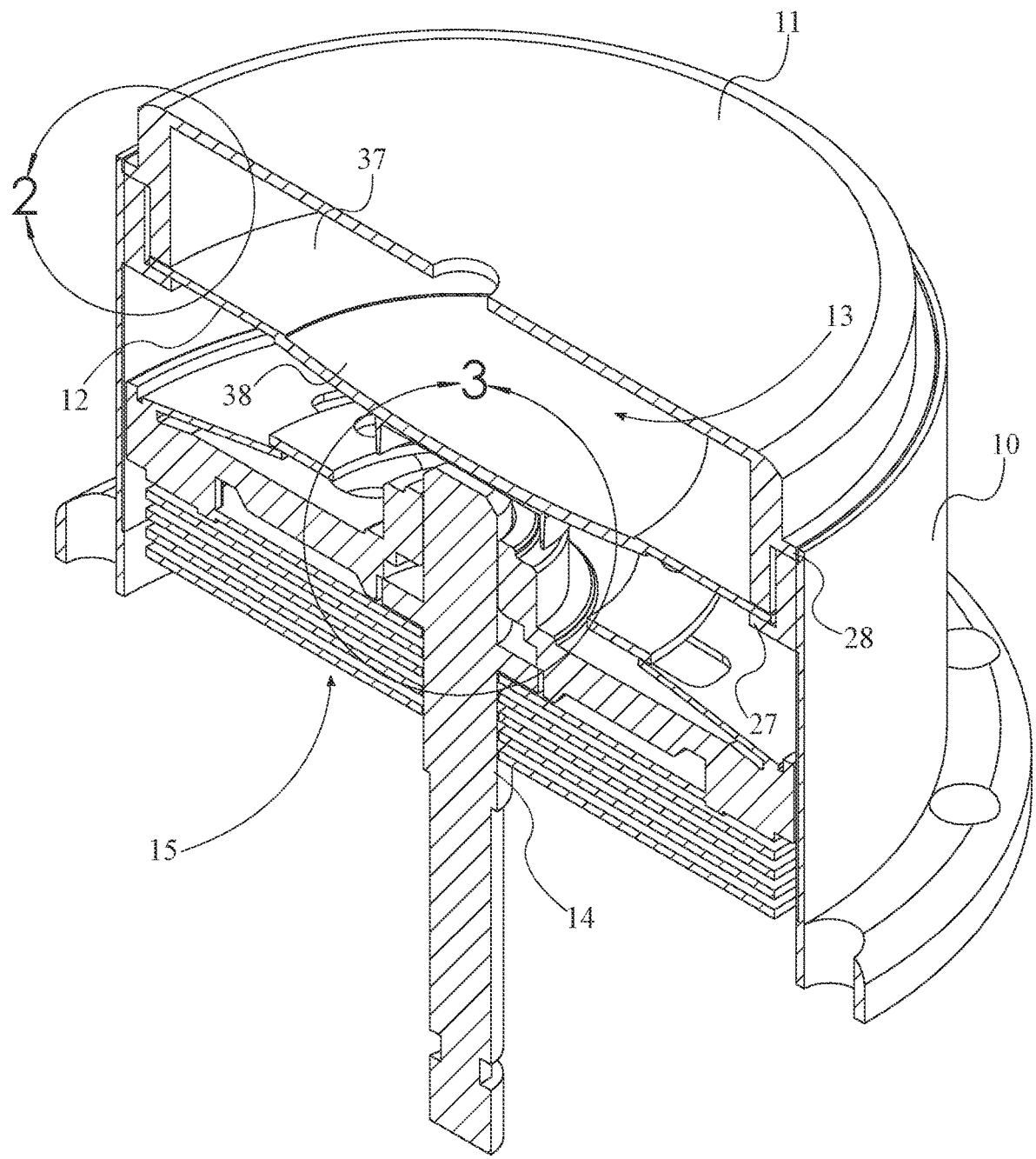
FIG. 1 is a sectional view of the present invention taken along an arbitrary line intersecting the center of an exemplary casing and an exemplary pressure housing.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIG. 1 through 6, the present invention is a clutch engagement booster system comprising a casing 10, a pressure housing 11, a diaphragm 12, an expansion chamber 13, at least one pressure source 25, at least one regulator device 16, an engagement member 14, and at least one clutch element 15. The overall function of the present invention is directed towards improving the engagement of the at least one clutch element 15 under load from a high-output engine or motor, wherein the excessive torque exerted against the at least one clutch element 15 would normally cause slippage. In a preferred application, the present invention is deployed and configured as a cooperative or supplemental system to be operated in tandem with an existing transmission, particularly in motorsport applications wherein a vehicle has been modified for increased power output exceeding the capacity of an existing transmission, gearbox, or drivetrain.

In reference to FIG. 1 through 4, the casing 10 refers to a rigid structural enclosure of suitable dimensions to seal and protect the moving parts of the present invention from debris fouling or damage, ideally defining a modified or remanufactured covering for an existing transmission to enable the direct 'bolt-on' modification of said transmission using factory mounting points. The pressure housing 11 refers to an airtight manifold configured for any given application, e.g., a heavier host transmission generally requires a correspondingly larger embodiment of the pressure housing 11 to enable the present invention to effectively support the operation of the clutch. The diaphragm 12 is positioned between the pressure housing 11 and the casing 10, wherein the diaphragm 12 and the pressure housing 11 delineate the expansion chamber 13. The diaphragm 12 broadly constitutes any flexible body that exerts a mechanical force in response to an increase in pressure within the expansion chamber 13. Accordingly, the expansion chamber 13 defines a substantially hollow space within the pressure housing 11 that may be pressurized above ambient pressure to actuate the diaphragm 12. The expansion chamber 13 is in fluid communication with the pressure source 25 through the at least one regulator device 16, thereby enabling said pressurization of the expansion chamber 13 in a controllable manner. The pressure source 25 is broadly considered to encompass any type of stored, on-demand, or passive means of generating a pressure differential between expansion chamber 13 and local ambient pressure. Likewise, the at least one regulator device 16 refers to any means of moderating the pressure differential to enable the actuation of the diaphragm 12 to be triggered at appropriate intervals to support clutch lock-up under load.

The at least one clutch element 15 ideally defines a selectively engaged fricative brake disposed between the input and output of the host transmission as shown in exemplary form in FIG. 1. Ideally, the at least one clutch element 15 is positioned within the casing 10 to ensure an unobstructed, consistent offset between the diaphragm 12 and the at least one clutch element 15. This functionality is ideally supported through the replacement of an original clutch cover or transmission access panel with an enlarged embodiment of a similar component defined by the casing 10. The engagement member 14 is slidably mounted into the at least one clutch element 15, wherein the engagement member 14 extends from the at least one clutch element 15 towards the diaphragm 12. The engagement member 14 ideally refers to a component of the host transmission configured to engage or disengage the clutch in an original unmodified configuration. In at least one embodiment, the engagement member 14 broadly defines an extended iteration of this component specifically configured to guide and direct the force exerted by the diaphragm 12 against the at least one clutch element 15, thereby assisting in clutch engagement. It is further considered that the engagement member 14 is configured to break contact with the diaphragm 12 or any other components within the casing 10 in at least one stage of operation, thereby reducing the overall rotating mass of the transmission with a corresponding increase in efficiency through all duty cycles of the transmission. Conversely, the diaphragm 12 is configured to deform towards the engagement member 14 in order to displace the engagement member 14 towards the at least one clutch element 15 as the expansion chamber 13 is pressurized. In an exemplary configuration of the present invention, the engagement member 14 is initially engaged against the at least one clutch element 15 by existing clutch control mechanisms, wherein this engagement is supplemented by the force exerted by the diaphragm 12 against the engagement member 14. To with, the engagement member 14 is both pulled by the factory transmission and pushed by the diaphragm 12, thereby increasing the coefficient of friction between the at least one clutch element 15 and any driven component of a connected drivetrain.

Figure 4:
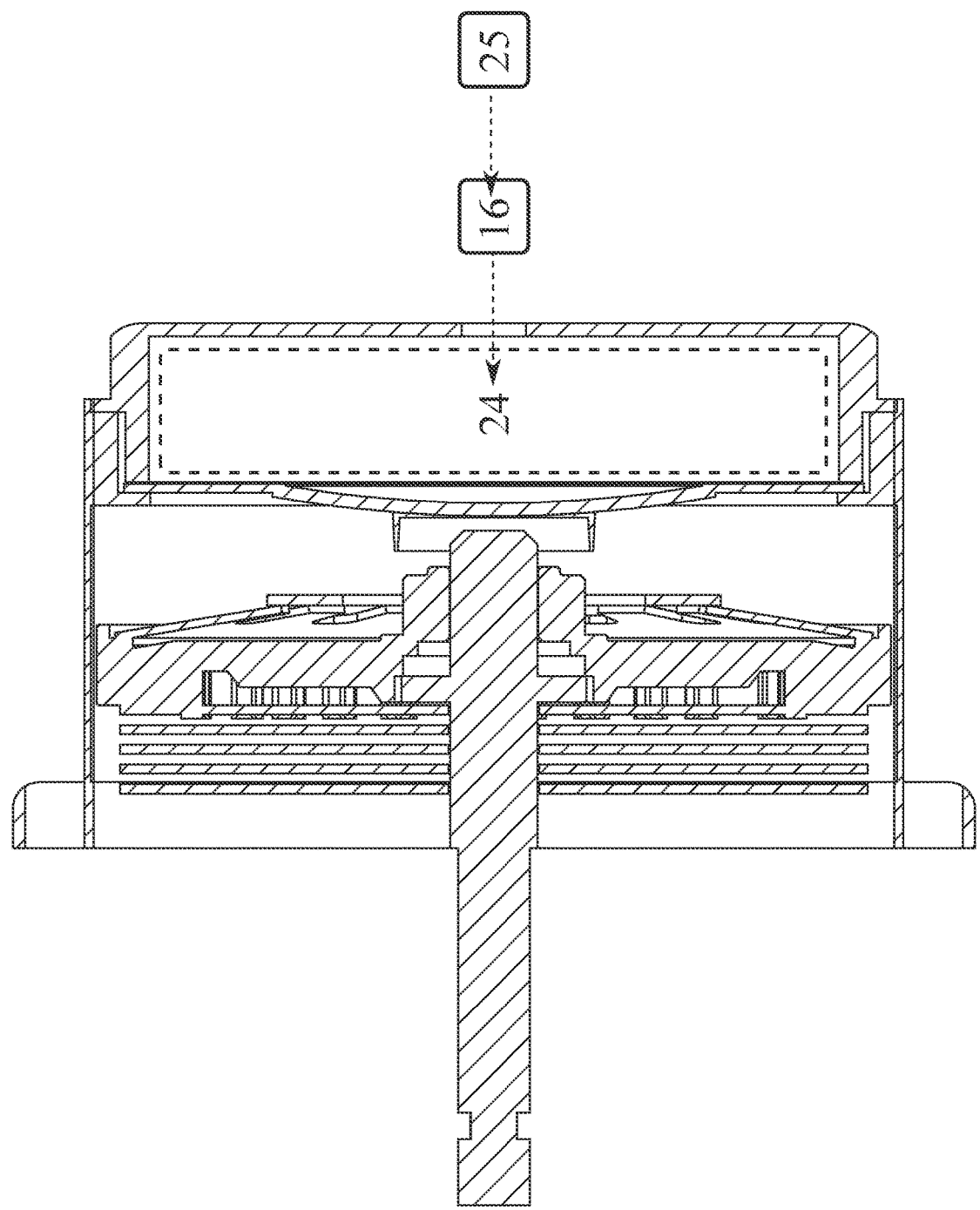
FIG. 4 is an elevational schematic view of the present invention, wherein the flow of pressure between components is shown in dashed-line.

It is considered that the repeated deformations of the diaphragm 12 may cause stresses within the material constituting the diaphragm 12, ultimately resulting in the formation of tears along the most-flexed areas of the diaphragm 12. Therefore, it is proposed that the diaphragm 12 is configured to adopt a static geometry that conforms to the deformed geometry as the expansion chamber 13 is pressurized. More specifically, the diaphragm 12 further comprises an elastic body 37 and a concave indentation 38 as illustrated in FIGS. 1 and 4. The elastic body 37 refers to any material that is deformable without work-hardening or suffering other cumulative damages. The concave indentation 38 constitutes a formation of the elastic body 37 that defines a static semi-ovoid profile that is at least partially similar to the inflated form of the diaphragm 12. The concave indentation 38 predisposes the diaphragm 12 to expanding uniformly under pressure, while simultaneously reducing the overall expansion necessary to achieve contact with the engagement member 14. More specifically, the concave indentation 38 is formed into the elastic body 37, concentric to the pressure housing 11, wherein the apex of the concave indentation 38 is adjacent to the engagement member 14. For a given offset between the diaphragm 12 and the engagement member 14 at-rest, the diaphragm 12 requires less deformation to make contact against the engagement member 14 in comparison to a any other geometry of the diaphragm 12. The elastic body 37 is perimetrically connected to the pressure housing 11 to maintain an airtight expansion chamber 13. Further, the diaphragm 12 is ideally engaged in a configuration that does not impede the regular expansion of the concave indentation 38 under load or otherwise compromise the integrity of the elastic body 37.

Figure 5:
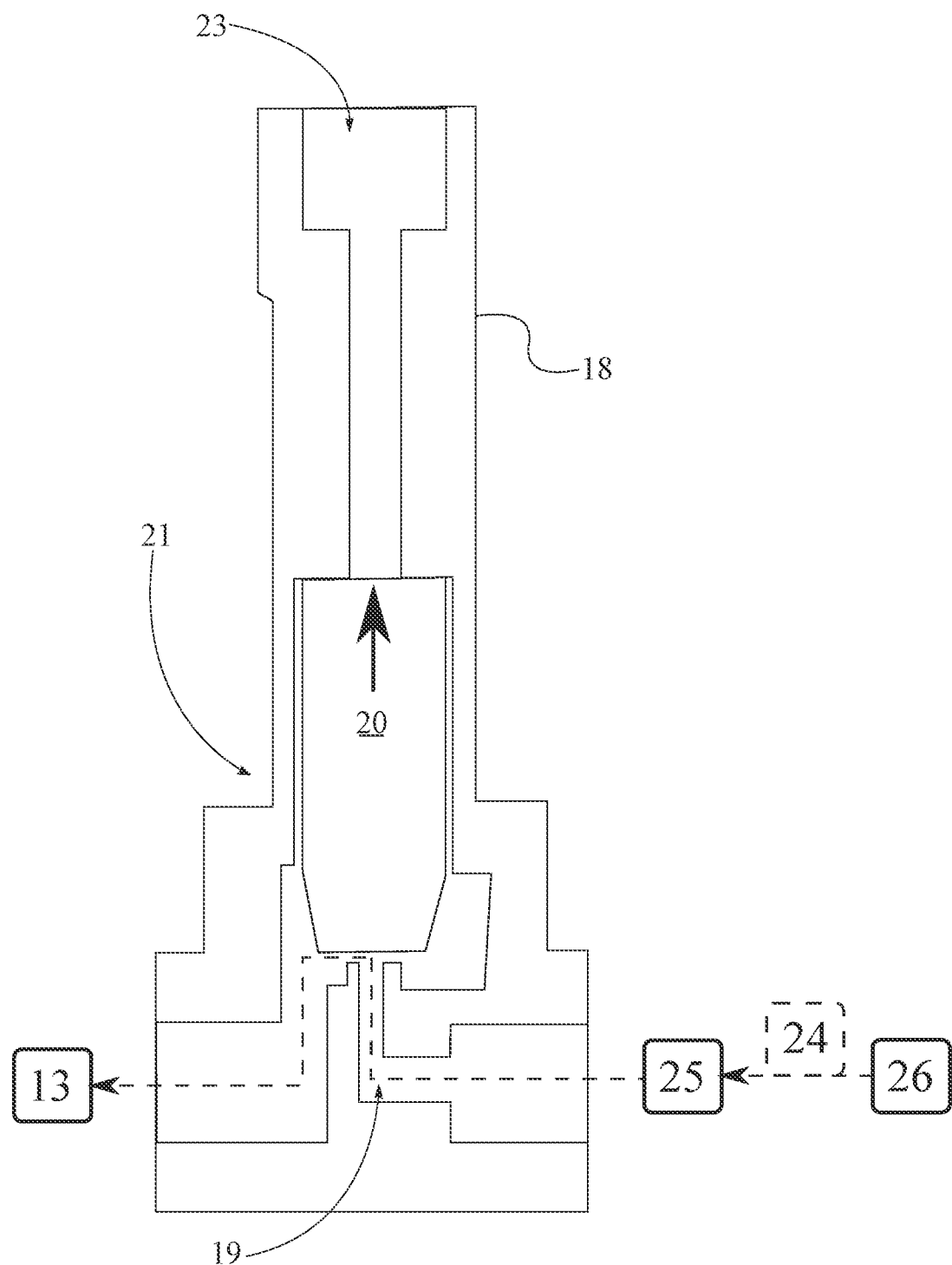
FIG. 5 is a simplified schematic view of an exemplary embodiment of at least one regulator device configured in a first position, wherein the flow of pressure between components is shown in dashed-line.
Figure 6:
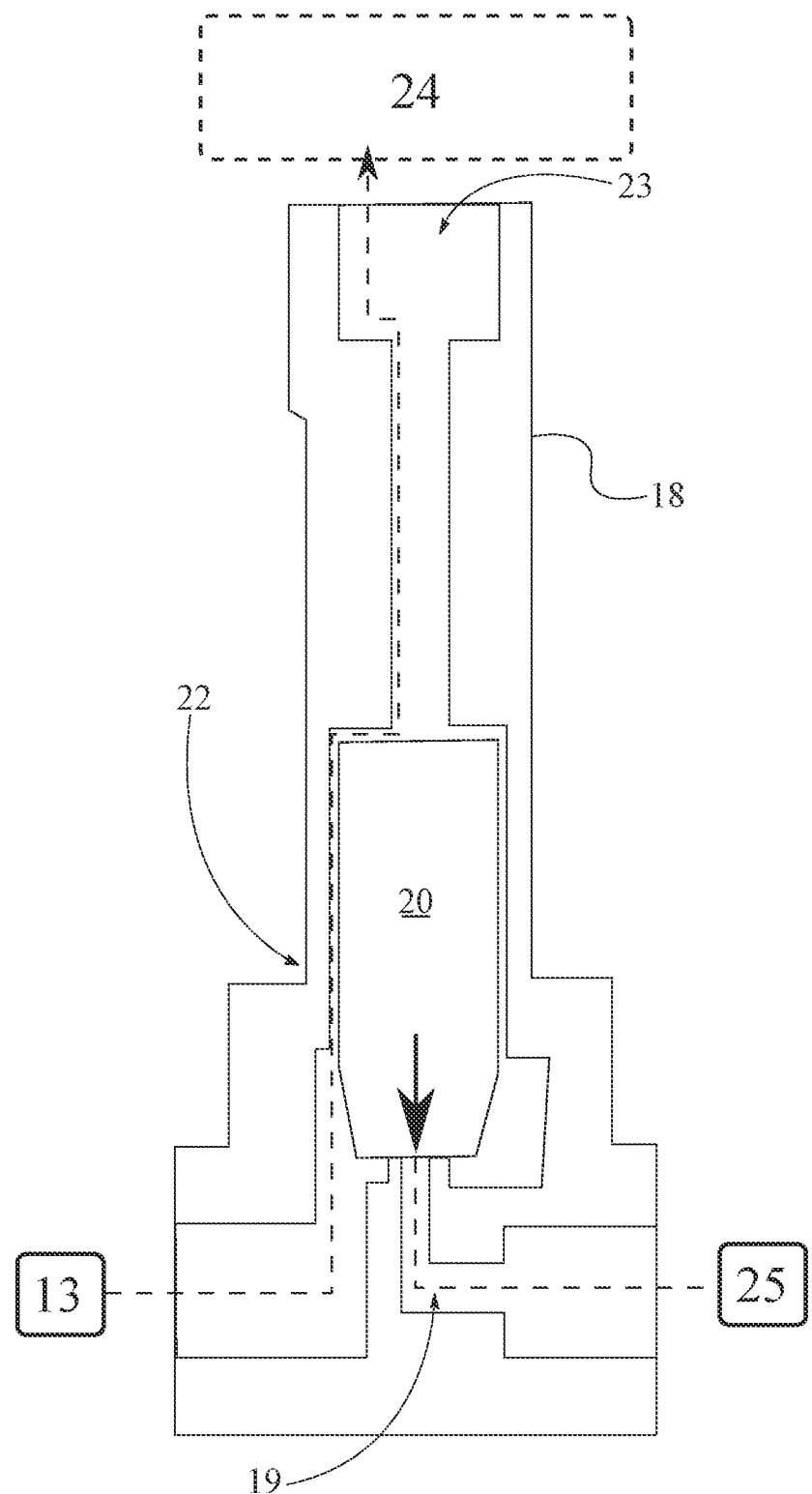
FIG. 6 is a simplified schematic view of an exemplary embodiment of at least one regulator device configured in a second position, wherein the flow of pressure between components is shown in dashed-line.

Conventional clutch-operated transmissions are known to require a means to operably engage and disengage the clutch to allow an operator to selectively impose a variable mechanical advantage between the input and output. It is recognized that the present invention must be configurable to operate in conjunction with many types and varieties of such a system across all conceivable embodiments. This also highlights the need for a means of moderating the pressure within the expansion chamber 13 that does not conflict with any existing clutch control mechanism, potentially causing damage to any connected drivetrain. Accordingly, the at least one regulator device 16 may further comprise a valve body 18, a vent port 23, a pressure conduit 19, and an actuated plunger 20. The valve body 18 defines an airtight manifold suitable for containing and supporting the vent port 23, pressure conduit 19, and actuated plunger 20. Accordingly, the vent port 23 and the pressure conduit 19 are formed into the valve body 18, wherein the vent port 23 is exposed to ambient pressure and the pressure conduit 19 is in fluid communication between the pressure source 25 and the expansion chamber 13. The actuated plunger 20 is slidably mounted within the valve body 18, wherein the position of the actuated plunger 20 is configured to selectively block either the vent port 23 or the pressure conduit 19 under the control of an operator or controller. More specifically, the actuated plunger 20 is configured to bistably displace between a first position 21 blocking the vent port 23 and a second position 22 blocking the pressure conduit 19, wherein the actuated plunger 20 is biased to the first position 21. As the actuated plunger 20 is biased to occupy the first position 21 when not under load, the pressure conduit 19 remains open to allow uninterrupted flow between the at least one pressure source 25 and the expansion chamber 13 as illustrated in FIG. 5, thereby deforming the diaphragm 12 and assisting the actuation of the engagement member 14 against the at least one clutch element 15. As the actuated plunger 20 is reconfigured into the second position 22, the vent port 23 becomes unblocked and equalizes pressure between the expansion chamber 13 and the ambient atmosphere as shown in FIG. 6, thereby relaxing the diaphragm 12 and releasing the engagement member 14 to allow the at least one clutch element 15 to disengage.

The present invention is primarily directed towards motorsport applications in which the power output of a drivetrain significantly exceeds factory limits, wherein stock clutch engagement becomes difficult to maintain due to the excess forces involved. These applications commonly involve the use of 'power-adders' such as forced induction systems—turbochargers and superchargers that compress air before being fed into a combustion engine. It is therefore considered that the pressure source 25 is configured to receive a volume of operating pressure 24 from a forced induction device 26 in at least one embodiment, wherein the volume of operating pressure 24 is scavenged from the forced induction device 26 as needed. More specifically, the pressure source 25 transfers the volume of operating pressure 24 from the forced induction device 26 to the at least one regulator, wherein the at least one regulator moderates any fluctuations in the volume of operating pressure 24 to ensure the proper positioning of the diaphragm 12 as shown in FIG. 4. This configuration is proposed as particularly useful in applications wherein the forced induction device 26 is dependent on engine speed, wherein the need for a clutch engagement (i.e., a gear shift) naturally coincides with a reduction in engine speed and a corresponding reduction in the volume of operating pressure.

Figure 3:
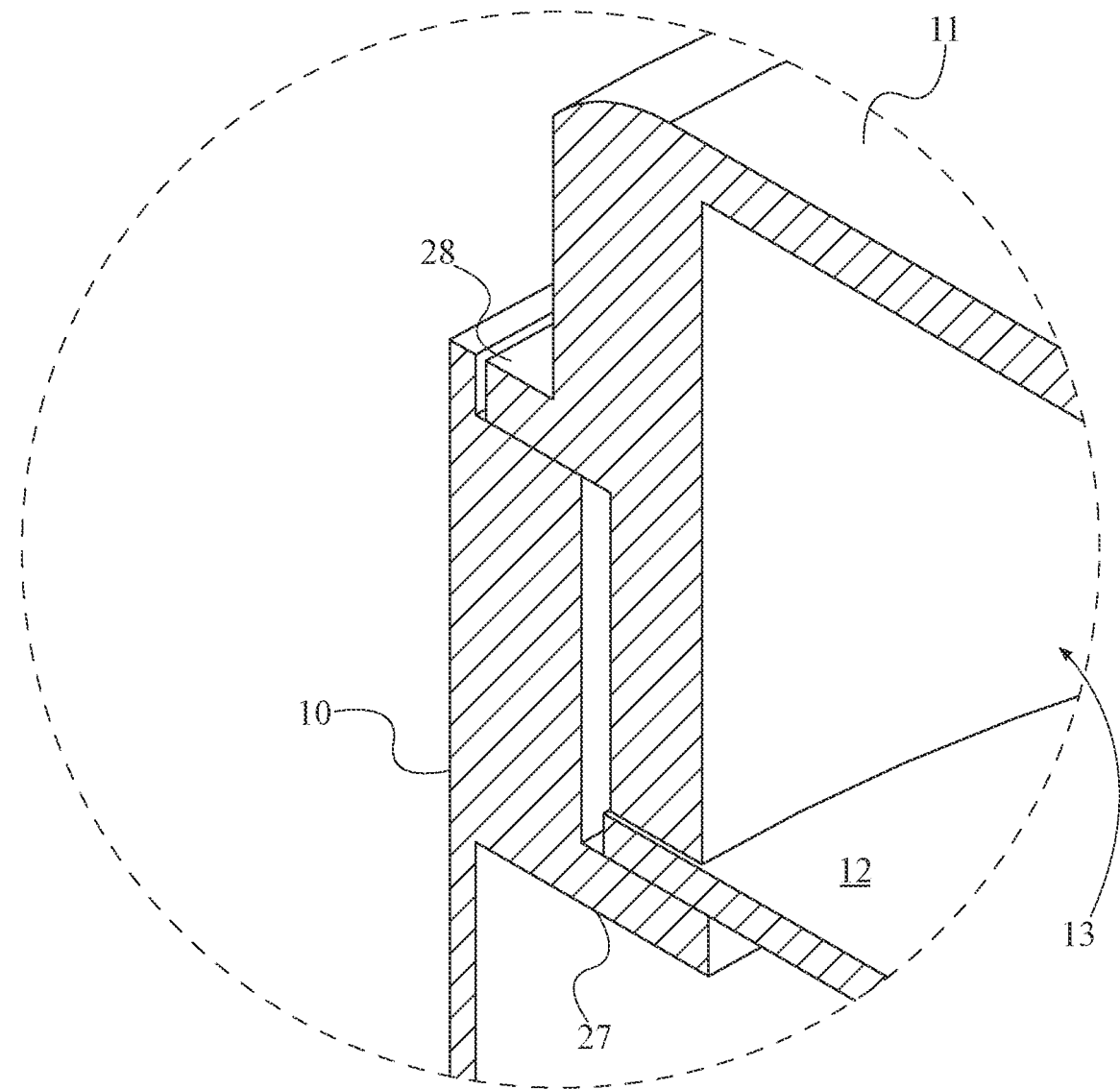
FIG. 3 is a detail view of area 3 in FIG. 1.

It is understood that the diaphragm 12 may require periodic maintenance or replacement, as might any other moving part or wear-item. At the same time, considerations must be made to ensure that the expansion chamber 13 remains airtight against the diaphragm 12; any pressure leaks substantially compromise the function of the present invention. Accordingly, the casing 10 further comprises a mounting shelf 27 and the pressure housing 11 further comprises a mounting lip 28 as shown in FIGS. 1 and 3. The mounting shelf 27 and the mounting lip 28 ideally define planar mating surfaces configured to uniformly capture and compress the diaphragm 12 as the casing 10 and the pressure housing 11 are engaged together. More specifically, the diaphragm 12 is removably mounted between the mounting shelf 27 and the mounting lip 28, wherein the diaphragm 12 forms an airtight seal against the mounting lip 28.

Figure 2:
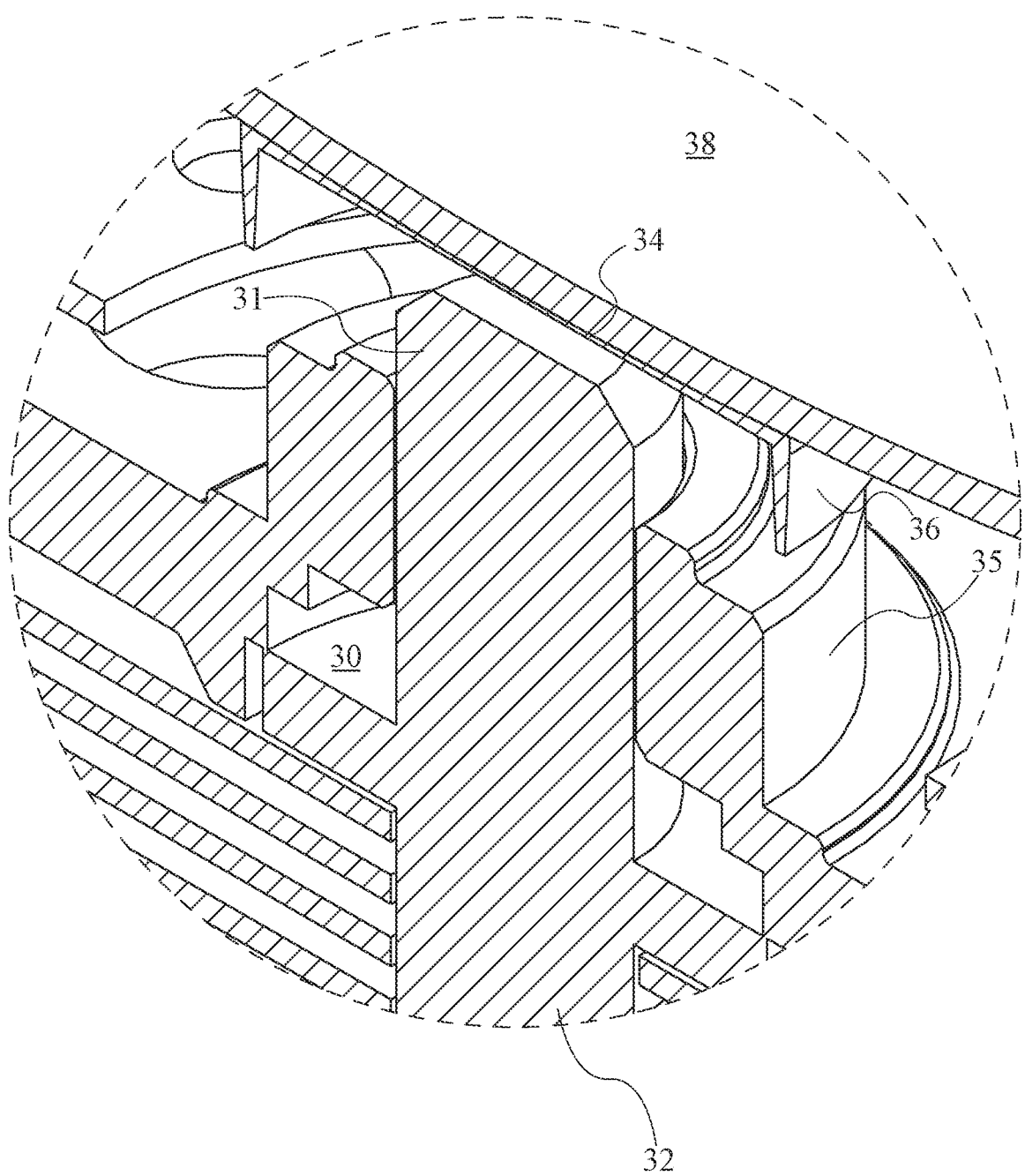
FIG. 2 is a detail view of area 2 in FIG. 1.

The impingement of the diaphragm 12 against the engagement member 14 is a core functionality of the present invention, defining the primary means of imparting an assistive engagement force against the at least one clutch element 15. Therefore, a repeatable, accurate, and durable engagement between the diaphragm 12 and the engagement member 14 must be ensured. Accordingly, the present invention may further comprise a striker plate 34, an annular spacer 35, and a receiver collar 36 to guide and align the diaphragm 12 and the engagement member 14 through all modes of operation. In reference to FIGS. 1 and 2, the striker plate 34 constitutes a substantially rigid, durable surface against which the engagement member 14 can impact without damaging the relatively fragile diaphragm 12. Accordingly, the striker plate 34 is bonded to the diaphragm 12, opposite the expansion chamber 13, wherein the striker place is directly exposed to the engagement member 14 within the casing 10. The annular spacer 35 is mounted between the striker plate 34 and the at least one clutch element 15, ideally defining a thrust bearing ring suitable to guide the force exerted by the expanding diaphragm 12 onto the engagement member 14. Accordingly, the receiver collar 36 is mounted onto the striker plate 34 concentric with the engagement member 14, wherein the receiver collar 36 is configured to receive the annular spacer 35 as the diaphragm 12 deforms under load. In at least one embodiment the receiver collar 36 is tapered to facilitate the engagement of the annular spacer 35 therein, should any misalignment occur whilst the diaphragm 12 is relaxed. As shown in FIGS. 1 and 2, the engagement member 14 is positioned within the annular spacer 35, extending from the at least one clutch element 15 towards the striker plate 34. In this arrangement the expansion of the diaphragm 12 aligns the annular spacer 35 within the receiver collar 36 as the striker plate 34 comes into contact with the engagement member 14, thereby ensuring a direct and consistent exertion of engagement force against the at least one clutch element 15.

In recognition of the immense variability in existing gearbox and transmission designs, it is understood that existing factory-specification instances of the engagement member 14 may be unsuitable for actuation by the diaphragm 12 without modification, replacement, or other compatibilization. For example, the engagement member 14 may be recessed within the at least one clutch element 15 or be otherwise prevented from direct exposure to the diaphragm 12 within the casing 10. Accordingly, the engagement member 14 further comprises a first shaft segment 31, a second shaft segment 32, and an engagement shelf 30 as shown in FIG. 2. The first shaft segment 31 is terminally connected to the engagement shelf 30. The second shaft segment 32 is also terminally connected to the engagement shelf 30, opposite the first shaft segment 31. The first shaft segment 31 and the second shaft segment 32 constitute dimensionally mismatched sections of the engagement member 14, ideally configured to engage into the at least one clutch element 15 with the first shaft segment 31 being exposed to the diaphragm 12. More specifically, the first shaft segment 31 is positioned through the annular spacer 35 and the second shaft segment 32 is positioned through the at least one clutch element 15. The engagement shelf 30 is positioned adjacent to the at least one clutch element 15, wherein the engagement shelf 30 defines a radial surface that extends away from the first shaft segment 31 and the second shaft segment 32. During use, the second shaft segment 32 is ideally retracted under force from any existing clutch control mechanism, whilst the first shaft segment 31 is advanced towards the at least one clutch element 15 by the deformation of the diaphragm 12. The engagement shelf 30 impinges onto the at least one clutch element 15 under load, engaging the at least one clutch element 15 with the combined forces exerted onto the first shaft segment 31 and the second shaft segment 32.

Although the invention has been explained in relation to its preferred embodiment, it is to be understood that many other possible modifications and variations can be made without departing from the spirit and scope of the invention as hereinafter claimed.

What is claimed is:
1. A clutch engagement booster system comprising:
a casing;
a pressure housing;
a diaphragm;
an expansion chamber;
at least one pressure source;
at least one regulator device;
an engagement member;
at least one clutch element;
the pressure housing being mounted to the casing;

the diaphragm being positioned between the pressure housing and the casing, wherein the diaphragm and the pressure housing delineate the expansion chamber;

the expansion chamber being in fluid communication with the pressure source through the at least one regulator device;

the at least one clutch element being positioned within the casing;

the engagement member being slidably mounted into the at least one clutch element, wherein the engagement member extends from the at least one clutch element towards the diaphragm; and the diaphragm being configured to deform towards the engagement member in order to displace the engagement member towards the at least one clutch element.

2. The clutch engagement booster system as claimed in claim 1 comprising:

the diaphragm further comprising an elastic body and a concave indentation;

the concave indentation being formed into the elastic body, concentric to the pressure housing, wherein an apex of the concave indentation is adjacent to the engagement member; and the elastic body being perimetrically connected to the pressure housing.

3. The clutch engagement booster system as claimed in claim 1 comprising:

the at least one regulator device comprising a valve body, a vent port, a pressure conduit, and an actuated plunger;

the vent port and the pressure conduit being formed into the valve body, wherein the vent port is exposed to ambient pressure and the pressure conduit is in fluid communication between the pressure source and the expansion chamber;

the actuated plunger being slidably mounted within the valve body; and the actuated plunger being configured to bistably displace between a first position blocking the vent port and a second position blocking the pressure conduit, wherein the actuated plunger is biased to the first position.

4. The clutch engagement booster system as claimed in claim 1 comprising:

the pressure source being configured to receive a volume of operating pressure from a forced induction device; and the pressure source transferring the volume of operating pressure from the forced induction device to the at least one regulator.

5. The clutch engagement booster system as claimed in claim 1 comprising:

the casing further comprising a mounting shelf;

the pressure housing further comprising a mounting lip; and the diaphragm being removably mounted between the mounting shelf and the mounting lip, wherein the diaphragm forms an airtight seal against the mounting lip.

6. The clutch engagement booster system as claimed in claim 1 comprising:

a striker plate;

an annular spacer;

a receiver collar;

the striker plate being bonded to the diaphragm, opposite the expansion chamber;

the annular spacer being mounted between the striker plate and the at least one clutch element;

the receiver collar being mounted onto the striker plate concentric with the engagement member, wherein the receiver collar is configured to receive the annular spacer as the diaphragm deforms under load; and the engagement member being positioned within the annular spacer, extending from the at least one clutch element towards the striker plate.

7. The clutch engagement booster system as claimed in claim 6 comprising:

the engagement member further comprising a first shaft segment, a second shaft segment, and an engagement shelf;

the first shaft segment being terminally connected to the engagement shelf;

the second shaft segment being terminally connected to the engagement shelf, opposite the first shaft segment;

the first shaft segment being positioned through the annular spacer;

the second shaft segment being positioned through the at least one clutch element; and the engagement shelf being positioned adjacent to the at least one clutch element.

8. A clutch engagement booster system comprising:

a casing;

a pressure housing;

a diaphragm;

an expansion chamber;

at least one pressure source;

at least one regulator device;

an engagement member;

at least one clutch element;

the pressure housing being mounted to the casing;

the diaphragm being positioned between the pressure housing and the casing, wherein the diaphragm and the pressure housing delineate the expansion chamber;

the expansion chamber being in fluid communication with the pressure source through the at least one regulator device;

the at least one clutch element being positioned within the casing;

the engagement member being slidably mounted into the at least one clutch element, wherein the engagement member extends from the at least one clutch element towards the diaphragm;

the diaphragm being configured to deform towards the engagement member in order to displace the engagement member towards the at least one clutch element;

a striker plate;

an annular spacer;

a receiver collar;

the striker plate being bonded to the diaphragm, opposite the expansion chamber;

the annular spacer being mounted between the striker plate and the at least one clutch element;

the receiver collar being mounted onto the striker plate concentric with the engagement member, wherein the receiver collar is configured to receive the annular spacer as the diaphragm deforms under load;

the engagement member being positioned within the annular spacer, extending from the at least one clutch element towards the striker plate.

9. The clutch engagement booster system as claimed in claim 8 comprising:

the engagement member further comprising a first shaft segment, a second shaft segment, and an engagement shelf;

the first shaft segment being terminally connected to the engagement shelf;

the second shaft segment being terminally connected to the engagement shelf, opposite the first shaft segment;

the first shaft segment being positioned through the annular spacer;

the second shaft segment being positioned through the at least one clutch element;

the engagement shelf being positioned adjacent to the at least one clutch element.

10. The clutch engagement booster system as claimed in claim 8 comprising:

the diaphragm further comprising an elastic body and a concave indentation;

the concave indentation being formed into the elastic body, concentric to the pressure housing, wherein an apex of the concave indentation is adjacent to the engagement member; and the elastic body being perimetrically connected to the pressure housing.

11. The clutch engagement booster system as claimed in claim 8 comprising:

the at least one regulator device comprising a valve body, a vent port, a pressure conduit, and an actuated plunger;

the vent port and the pressure conduit being formed into the valve body, wherein the vent port is exposed to ambient pressure and the pressure conduit is in fluid communication between the pressure source and the expansion chamber;

the actuated plunger being slidably mounted within the valve body; and the actuated plunger being configured to bistably displace between a first position blocking the vent port and a second position blocking the pressure conduit, wherein the actuated plunger is biased to the first position.

12. The clutch engagement booster system as claimed in claim 8 comprising:

the pressure source being configured to receive a volume of operating pressure from a forced induction device; and the pressure source transferring the volume of operating pressure from the forced induction device to the at least one regulator.

13. The clutch engagement booster system as claimed in claim 8 comprising:

the casing further comprising a mounting shelf;

the pressure housing further comprising a mounting lip; and the diaphragm being removably mounted between the mounting shelf and the mounting lip, wherein the diaphragm forms an airtight seal against the mounting lip.

14. A clutch engagement booster system comprising:

a casing;

a pressure housing; and a diaphragm;

an expansion chamber;

at least one pressure source;

at least one regulator device;

an engagement member;

at least one clutch element;

the pressure housing being mounted to the casing;

the diaphragm being positioned between the pressure housing and the casing, wherein the diaphragm and the pressure housing delineate the expansion chamber;

the expansion chamber being in fluid communication with the pressure source through the at least one regulator device;

the at least one clutch element being positioned within the casing;

the engagement member being slidably mounted into the at least one clutch element, wherein the engagement member extends from the at least one clutch element towards the diaphragm;

the diaphragm being configured to deform towards the engagement member in order to displace the engagement member towards the at least one clutch element;

a striker plate;

an annular spacer;

a receiver collar;

the striker plate being bonded to the diaphragm, opposite the expansion chamber;

the annular spacer being mounted between the striker plate and the at least one clutch element;

the receiver collar being mounted onto the striker plate concentric with the engagement member, wherein the receiver collar is configured to receive the annular spacer as the diaphragm deforms under load;

the engagement member being positioned within the annular spacer, extending from the at least one clutch element towards the striker plate;

the pressure source being configured to receive a volume of operating pressure from a forced induction device;

the pressure source transferring the volume of operating pressure from the forced induction device to the at least one regulator.

15. The clutch engagement booster system as claimed in claim 14 comprising:

the engagement member further comprising a first shaft segment, a second shaft segment, and an engagement shelf;

the first shaft segment being terminally connected to the engagement shelf;

the second shaft segment being terminally connected to the engagement shelf, opposite the first shaft segment;

the first shaft segment being positioned through the annular spacer;

the second shaft segment being positioned through the at least one clutch element; and the engagement shelf being positioned adjacent to the at least one clutch element.

16. The clutch engagement booster system as claimed in claim 14 comprising:

the diaphragm further comprising an elastic body and a concave indentation;

the concave indentation being formed into the elastic body, concentric to the pressure housing, wherein an apex of the concave indentation is adjacent to the engagement member; and the elastic body being perimetrically connected to the pressure housing.

17. The clutch engagement booster system as claimed in claim 14 comprising:

the at least one regulator device comprising a valve body, a vent port, a pressure conduit, and an actuated plunger;

the vent port and the pressure conduit being formed into the valve body, wherein the vent port is exposed to ambient pressure and the pressure conduit is in fluid communication between the pressure source and the expansion chamber;

the actuated plunger being slidably mounted within the valve body; and the actuated plunger being configured to bistably displace between a first position blocking the vent port and a second position blocking the pressure conduit, wherein the actuated plunger is biased to the first position.

18. The clutch engagement booster system as claimed in claim 14 comprising:

the casing further comprising a mounting shelf;

the pressure housing further comprising a mounting lip; and the diaphragm being removably mounted between the mounting shelf and the mounting lip, wherein the diaphragm forms an airtight seal against the mounting lip.

\* \* \* \* \*